US 10,024,455 B2

(12) United States Patent
De Luca et al.

(10) Patent No.: US 10,024,455 B2
(45) Date of Patent: Jul. 17, 2018

(54) STOPPER CONTROL DEVICE

(71) Applicant: Danieli & C. Officine Meccaniche S.p.A., Buttrio (IT)

(72) Inventors: Andrea De Luca, Via Condotti (IT); Stefano Del Tedesco, Fontanafredda (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 122 days.

(21) Appl. No.: 14/441,501

(22) PCT Filed: Nov. 8, 2013

(86) PCT No.: PCT/IB2013/059999
§ 371 (c)(1),
(2) Date: May 7, 2015

(87) PCT Pub. No.: WO2014/072943
PCT Pub. Date: May 15, 2014

(65) Prior Publication Data
US 2015/0292645 A1 Oct. 15, 2015

(30) Foreign Application Priority Data
Nov. 9, 2012 (IT) .............. MI2012A1914

(51) Int. Cl.
*F16K 31/22* (2006.01)
*B22D 37/00* (2006.01)
*B22D 41/20* (2006.01)
*F16K 31/122* (2006.01)

(52) U.S. Cl.
CPC ............ *F16K 31/122* (2013.01); *B22D 37/00* (2013.01); *B22D 41/20* (2013.01)

(58) Field of Classification Search
CPC ........ B22D 37/00; B22D 41/20; F16K 31/122
USPC ...... 266/236, 78, 272; 222/602, 595; 251/57
See application file for complete search history.

(56) References Cited

U.S. PATENT DOCUMENTS

| 2,832,110 | A | * | 4/1958 | Carleton, Jr. ......... B22D 41/20 222/545 |
| 3,309,740 | A | * | 3/1967 | Teplitz ................. B22D 41/20 251/62 |
| 5,421,559 | A | * | 6/1995 | Basler ................... B22D 41/20 222/602 |

FOREIGN PATENT DOCUMENTS

| CN | 101598232 | 12/2009 |
| FR | 2184520 A1 | 12/1973 |
| GB | 1246439 A | 9/1971 |

* cited by examiner

*Primary Examiner* — Scott Kastler
*Assistant Examiner* — Michael Aboagye
(74) *Attorney, Agent, or Firm* — Stetina Brunda Garred & Brucker

(57) ABSTRACT

A control device (1) for a stopper (3) comprises: —an outer casing (10), —a control rod (6) sliding through the casing (10), rigidly attachable to the stopper (3), —a hydraulic circuit (20) including a double-acting hydraulic cylinder (21) and a reversible hydraulic pump (9), the hydraulic cylinder (21) having a first and a second chamber (21a, b) between which a piston (22) slides, the hydraulic pump (9) being connected directly to the first and second chamber (21a, b) by means of a first branch and a second branch (20a, b) of said hydraulic circuit (20, respectively, the piston being rigidly attached to the control rod (6), the hydraulic circuit (20) being entirely housed in the outer casing (10), —a control circuit (30) connected to the hydraulic circuit (20) to control the position of the piston (22).

12 Claims, 3 Drawing Sheets

STOPPER CONTROL DEVICE

CROSS REFERENCE TO RELATED APPLICATIONS

The present application claims priority to PCT International Application No. PCT/IB2013/059999 filed on Nov. 8, 2013, which application claims priority to Italian Patent Application No. MI2012A001914 filed Nov. 9, 2012, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a control device for a stopper that can be used to adjust the outflow of liquid steel from a ladle or a tundish.

STATE OF THE ART

The stopper or stopper rod is a member known in steelworks which adjusts the outflow of a liquid steel casting from a ladle or a tundish towards an ingot mold by interacting with a calibrated bole or orifice.

Typically, the stopper is continuously adjusted as a function of the level of steel in the ingot mold. Such a level is monitored, also continuously, by a radioactive sensor which sends a signal to a programmable logical controller (known as PLC) which controls a motorized stopper control device. The stopper must be controlled so as to guarantee the presence of a stable meniscus in the ingot mold in all operative conditions. The control device must therefore guarantee high actuating speed of the stopper, in particular for high casting speeds.

There are two types of control devices known in the art mentioned above: electromechanical and hydraulic. The electromechanical devices adjust the displacement of the stopper by means of an electric motor and a mechanism connected to the motor, comprising a worm gear or a pinion and a respective rack. The main disadvantages of the electromechanical devices are:
  slow response times
  complex parts
  high number of mechanical components with respect to other solutions, which imply clereance, and consequent inaccurate stopper position control and need for frequent maintenance operations to check and adjust such a clereance.

Furthermore, because of the presence of said clereance, the position of the stopper must be determined by means of a linear displacement transducer directly on the stopper holder arm. A sensor of such a type is typically subject to malfunctions.

The hydraulic or hydrodynamic devices, instead, allow to obtain a better response with respect to the electromagnetic devices, but generally require the presence of hydraulic control units and valves, with consequent considerable increase of dimensions and costs. Also in this case, frequent maintenance is needed due to the presence, in particular, of a high number of mobile parts subject to wear between the lifting rod, which adjusts the upward or downward movement of the stopper, and the servo motor and the needs for presence of an oil filter system. Additionally, the conventional hydraulic devices are of dissipative type: indeed, they require the fluid to be circulated continuously upstream by a servo valve, which allows the passage towards a hydraulic actuator only when required. A device of this type requires a considerable amount of fluid provided by an external source and implies a continuous consumption of energy for generating fluid circulation.

An example of a hydraulic stopper control device is described in U.S. Pat. No. 5,421,559. In such a device, the vertical motion of the lifting rod is transmitted by means of a rigid outer member integral thereto and connected to a drive unit by means of a rod of a piston sliding in a cylinder. A complex valve system is additionally provided for controlling the flow of hydraulic fluid for actuating the piston. This solution implies the presence of an external tank for the hydraulic fluid to which the device must be connected by means of pipes. Furthermore, the connection between the rigid member and the lifting rod determines the presence of clereance also for this type of device.

Furthermore, the servo valves generally comprised in the conventional hydraulic devices determine a plurality of drawbacks, the main ones being:
  slow operating speed of the servo valve with consequent low overall reactivity of the hydraulic circuit;
  open circuit operation with consequent need to provide external hydraulic attachments;
  high running and maintenance costs because the servo valves normally have short lifecycles.

SUMMARY OF THE INVENTION

Thus, it is a specific task of this invention to provide a control device for a stopper which allows to adjust the outflow of liquid steel through a ladle or tundish which solves the drawbacks described above with reference to the mentioned prior art.

In particular, it is intended to provide a device that is conservative, i.e. which only consumes the amount of energy needed to move the stopper.

It is a further object to provide a device which allows to reach good performance levels, in terms of reactivity and accuracy, guaranteeing small dimensions at the same time.

Another object is that of canceling out the plays of all components involved in stopper actuation, thus allowing to adjust the steel flow more accurately.

Another object is to make a hydraulic device which has a low maintenance level.

A further object of the present invention is to provide a hydraulic control device for a stopper controlled by a hydraulic circuit which is much smaller in size than the known solutions, in terms of length of the hydraulic line and amount of fluid needed as a whole.

Such objects are reached by a control device for a stopper, said device comprising:
  an outer casing,
  a control rod sliding through said casing, rigidly attachable to said stopper,
  a hydraulic circuit including a double-acting hydraulic cylinder and a reversible hydraulic pump, said hydraulic cylinder having a first and a second chamber between which a piston slides, said hydraulic pump being connected to said first and second chamber, said piston being rigidly attached to said control rod,
  a control circuit connected to said hydraulic circuit to control the position of said piston, said device being characterized in that said reversible pump is directly connected to said first and second chamber of said hydraulic actuator by means of a first branch and a second branch of said hydraulic circuit, respectively.

According to a further aspect of the invention, the problems mentioned above are solved by means of an apparatus comprising:
- a molten steel vessel including a drain hole for the flow of said molten steel,
- a stopper working on said drain hole to adjust said flow of steel,
- a control device for said stopper comprising:
  - an outer casing,
  - a control rod sliding through said casing, rigidly attachable to said stopper,
  - a hydraulic circuit including a double-acting hydraulic cylinder and a reversible hydraulic pump, said hydraulic cylinder having a first and a second chamber between which a piston slides, said hydraulic pump being connected to said first and second chamber, said piston being attached to said control rod,
  - a control circuit connected to said hydraulic circuit to control the position of said piston, said device being characterized in that said reversible pump is directly connected to said first and second chamber of said hydraulic actuator by means of a first branch and a second branch of said hydraulic circuit, respectively.

BRIEF DESCRIPTION OF THE FIGURES

Further features and advantages of the present invention will be more apparent in light of the detailed description of a preferred, but not exclusive, embodiment of a control device for a stopper according to the present invention illustrated by the way of non-limitative example, with reference to the accompanying drawings, in which.

DETAILED DESCRIPTION OF THE INVENTION

Figure 1:
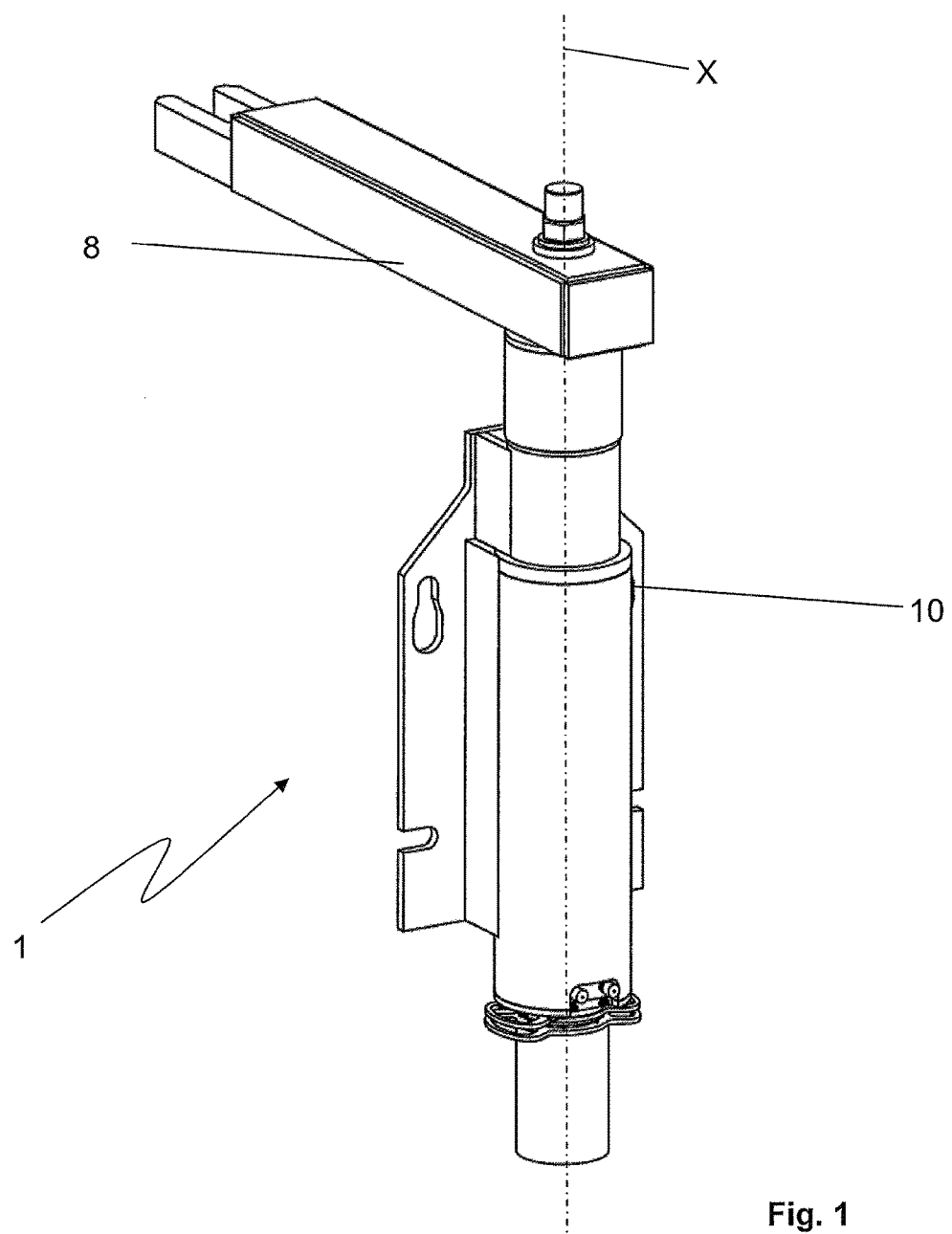
FIG. 1 is an axonometric view of a control device for a stopper for adjusting the outflow of a casting according to the present invention.
Figure 2:
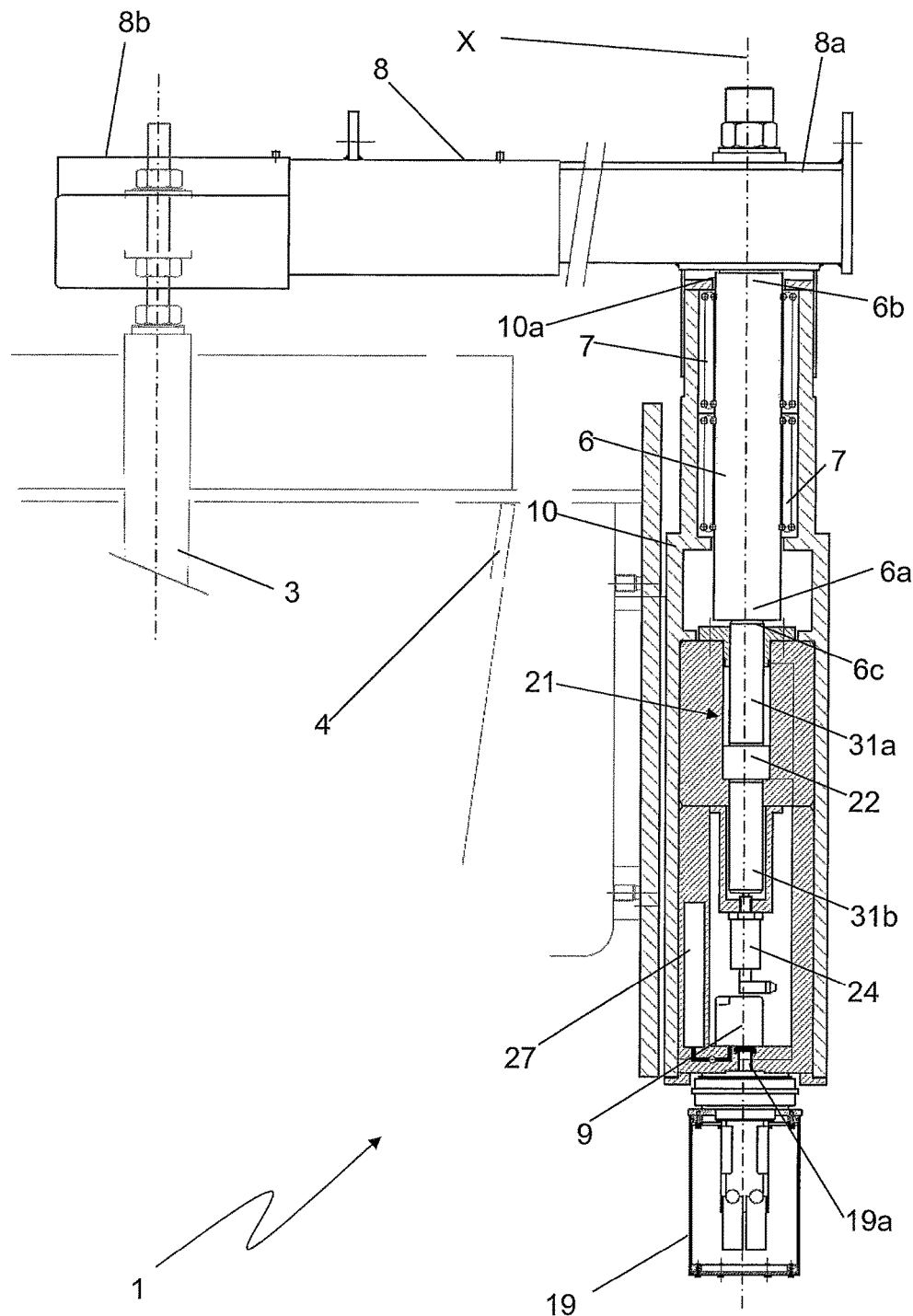
FIG. 2 is a side section view of the device in FIG. 1.

With reference to the appended figures, a hydraulic control device of a stopper 3 (shown only in part) by adjusting its height is indicated by reference numeral 1 as a whole. The stopper 3 allows to adjust the degree of opening of a drain hole (not shown) of a vessel 4 (shown only partially) for molten metal. The vessel 4 typically consists of a tundish. The outflow of steel from the drain hole of the vessel 4 is collected in an ingot mold (not shown).

The hydraulic device 1 comprises a lever (not shown in the accompanying figures) by means of which the position of the stopper 3 can be adjusted manually in case of malfunctions to the hydraulic device 1 or in emergency conditions.

Figure 3:
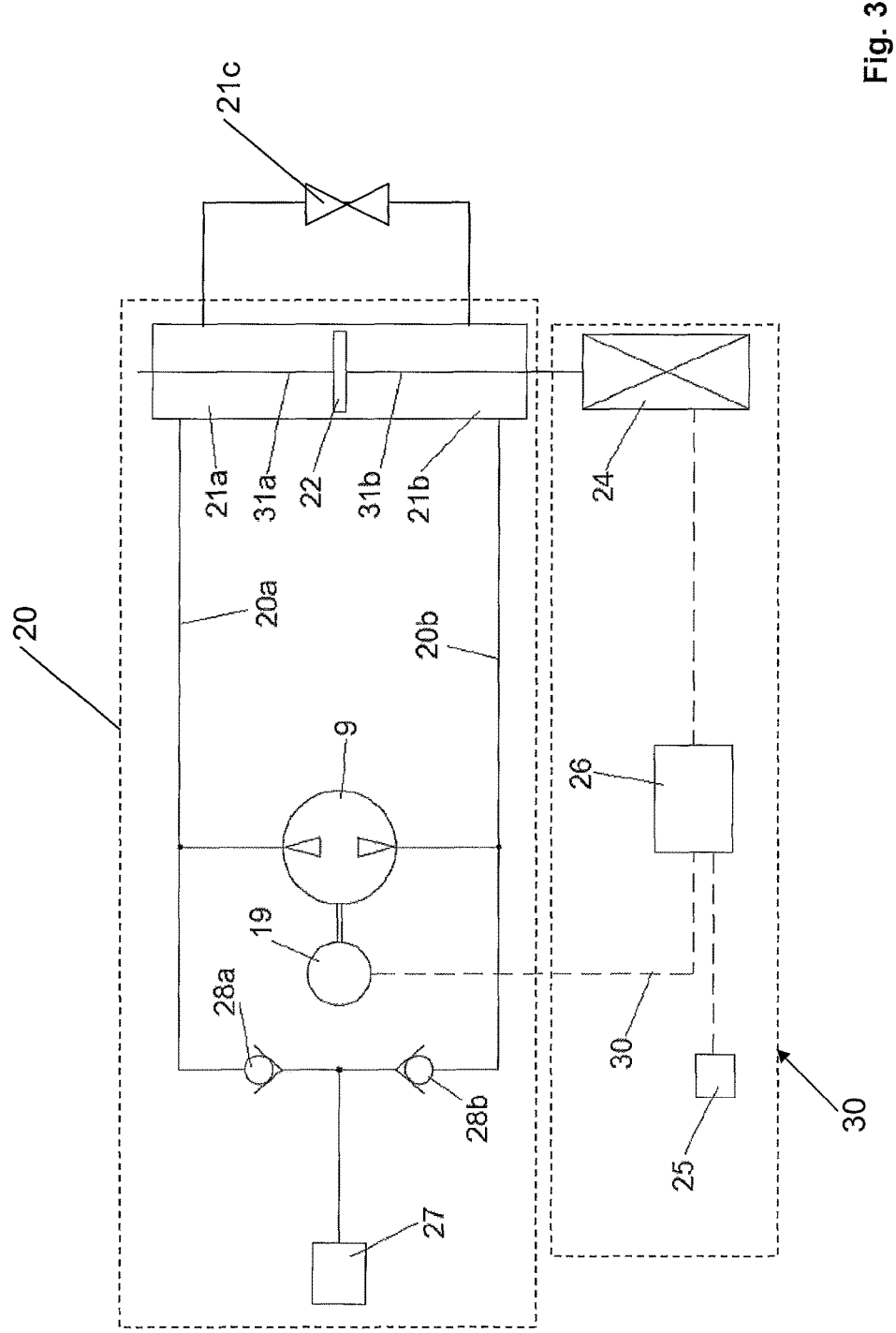
FIG. 3 is a hydraulic diagram for actuating the control device in FIG. 1.

The hydraulic device 1 comprises a containing frame 10, in which a closed, pressurized hydraulic circuit 20 is provided. With respect to the hydraulic circuits of the open type used in conventional dissipative hydraulic devices, which typically comprise a hydraulic unit, the hydraulic circuit 20 is characterized by very small size. The hydraulic circuit 20 comprises a hydraulic actuator 21 connected to the stopper 3 to adjust its height. The hydraulic actuator 21 is of the double-acting type comprising a first and second chamber 21a, b, between which a piston 22 slides, the piston 22 being, rigidly connected to a first upper rod 31a and to second lower rod 31b, counterpoised with respect to the rod 31a and of equal diameter thereto. The two chambers 21a and 21b are optionally put into communication by means of a normally open bypass valve 21e (only diagrammatically shown in FIG. 3) or a calibrated orifice, in order to make the downward movement of the rod faster in case of emergency and manual actuation easier. In possible variants of the present invention, there is no bypass valve 21c. The central piston 22 sliding in both senses of a same axial direction is coinciding with a longitudinal axis X of the hydraulic actuator 21. A control rod 6 is connected to the upper rod 31a by means of rigid axial attachment placed on a first axial end 6a of the control rod 6 and, for example, consisting of a threaded coupling comprising a screw 6c aligned along axis X. The control rod 6 is thus rigidly connected to the piston 22 by means of the coupling with the upper rod 31a. The control rod 6 slides through a hole 10a of the frame 10 coaxial with axis X. The sliding of the piston 22 towards either one or the other of the axial ends of the hydraulic actuator 21 causes the agreeing movement of the control rod 6 along axis X. The alignment of the control rod 6 and axis X is advantageously maintained by effect of a plurality of linear guides with ball recirculation 7.

The hydraulic device further comprises an arm 8 rigidly connected to the control rod 6. The arm 8 extends in direction nearly orthogonal to axis X between a first end 9a and a second end 8b. The first end 8a is rigidly connected, for example by means of a threaded coupling, to a second end 6b of the control rod 6, axially counterpoised to the first end 6a. The second end 8a is rigidly connected, for example by threaded coupling, to the stopper 3. The movement of the control rod 6 is transmitted to the stopper 3 by means of the arm 8.

In order to control the displacement of the piston 22, the hydraulic circuit 20 comprises a reversible pump 9, connected to the first and the second chamber 21a, b of the actuator by means of a first branch and a second branch 20a, b of the hydraulic circuit 20, respectively. The pump 9 is placed inside the frame 10, advantageously on the side of the lower rod 31b.

The rotation of the reversible volumetric pump 9 in one sense or in the other allows to send oil directly to either one or the other of the chambers 21a, b of the actuator 21, thus determining the movement of the piston 22 and of the rod 31 in either one direction or in the opposite direction, respectively. According to another variant of the invention, another equivalent fluid can be used in the circuit 20 instead of oil.

The first and the second branches 20a, b are connected upstream of the reversible pump 9 to an accumulator or top-up source 27, which allows to top-up any loss of fluid from the hydraulic circuit 20. A first and a second check valve 28a, b, oriented so as to prevent the flow from the pump 9 to the top-up source 27 and allowing the flow in the opposite direction are provided between the top-up source 27 and the reversible pump 9 on the second branch 20a, b, respectively.

The pump 9 is actuated by an electric motor 19, advantageously of the brushless or stepper type, connected to it either in fixed manner or by means of a quick connector 19a of known type, e.g. a flanged quick connector or a ball connector or a bayonet connector. In a possible variant, the actuator 21 can be extracted from the frame 10 joined to the reversible pump 9 and the electric motor 19 by means of a quick connector (not shown) between the control rod 6 and the piston 22.

The use of the reversible pump 9 and of the brushless motor 19 allows to connect the first and the second chamber 21a, b of the actuator 21 directly to the pump 9, thus avoiding the use of the servo valve, normally used in other hydraulic circuits. Furthermore, this allows to decrease the amount of fluid needed in the hydraulic circuit 20 and the total length of the circuit itself. The amount of fluid needed for the operation of the hydraulic circuit 20, given by the circulating amount of fluid and the fluid present in the top-up source 27, may be advantageously comprised between 0.05 and 0.5 liters, preferably between 0.1 and 0.2 liters. The overall length of the hydraulic line in which the fluid circulates is advantageously comprised between 0.5 and 2 meters, preferably between 1 and 1.5 meters.

The position of the piston 22 in the cylinder thus depends on the angular position of the motor 19 of the pump 9, while the movement speed of the cylinder depends on the angular speed of the pump 9. The reversible volumetric pump 9 allows to displace the amount of liquid actually needed to move the piston 22 required by the control system (particularly small oil volumes may flow). The hydraulic circuit 20 is closed and pressurized, i.e. free from hydraulic control unit, and therefore the same amount of fluid always circulates therein. The motor 19 of the pump 9 determines each movement of fluid in the hydraulic circuit 20: consequently, if the motor 19 does not operate the pump 9, the flow of fluid in each point of the hydraulic circuit 20 is substantially zero and the piston 22 does not move. The device thus made is of the conservative type because the energy consumption is directly correlated to the displacement of the piston 22. Indeed, the device 1 only consumes the energy needed to displace the stopper 3 and, when the displacement of the stopper 3 is not required, because the fluid in the circuit is stationary, there is no energy consumption.

The reversible pump 9, and thus the actuator 21 are controlled in controlled manner. In order to allow to control the reversible pump 9 and the actuator 21, the hydraulic device 1 comprises a control circuit 30 connected to the hydraulic circuit 20. The control circuit 30 may, for example, be based on predictive methods or work in feedback according to the measurement of some operative parameters. In the case in which the control system 20 is of the feedback type, it may advantageously comprise a level sensor 25 which detects the level of steel in the ingot mold and a position transducer 24 to detect the position of the piston 22. The level sensor 25 detects the level of the molten steel meniscus in the ingot mold so that the outflow of steel from the vessel 4 needed to obtain the required meniscus level can be identified. The control circuit 30 additionally comprises a control unit 26 by means of which the electric motor 19 is controlled. The control unit 26 is connected to the position transducer 24 and to the position sensor 25, so as to be able to obtain feedback control, comprising:
- a first step of controlling in which the control unit 26 receives data related to the level of the meniscus from the sensor 25;
- a second step of controlling in which the control unit 26 determines the position to which the stopper 3 must be taken, i.e. the position to which the piston 22 must be taken;
- a third step of controlling in which on the basis of the position of the piston 22 received from the position transducer 24 determines the displacement which must be imparted to the piston 22 to reach the position determined during said second step of controlling;
- a fourth step of controlling in which the control unit 26 controls the electric motor 19 to activate the pump 9 to send oil to the first or second branch 20a, b so that the piston 22 can reach the position determined during said second step of controlling.

The control is continuously implemented.

In the embodiment shown in the figures, the hydraulic circuit 20, closed and pressurized, is advantageously entirely housed in the containing frame 10. In other embodiments, part of the circuit, e.g. the hydraulic actuator, can be taken to an area external to the containing frame 10, but connected closely to it. In all cases, the hydraulic circuit 20 is closed and pressurized and therefore no external attachments nor an oil tank external to the frame 10 are needed. The hydraulic circuit 20 may be advantageously sealed inside the frame 10 so as to be isolated from the external environment which generally, in the scope of use of the present invention, is rather hard for the presence of dirt, dust or the like. This allows to avoid excessive component wear and guarantee good operation of the system for a long time, limiting maintenance operations to the minimum.

By comprising a closed, pressurized hydraulic system in which only a minimum amount of oil is moved, i.e. the amount necessary to move the piston of the hydraulic actuator, the device of the present invention does not determine wastes of energy and is thus conservative. The use of a device of this type further allows to obtain a hydraulic device characterized by high efficiency and high reactivity; this is further promoted by the use of a hydraulic pump controlled by an electric motor which allows to reach high operating speeds.

A further advantage are the rigid attachments between the upper rod 31a, the control rod 6, the arm 8 and the stopper 3 which allow to either eliminate or minimize the overall play between piston 22 and stopper 3.

The invention claimed is:

1. A control device for a stopper being usable to adjust an outflow of liquid steel from a vessel, said device comprising:
   a containing frame,
   a control rod sliding through said frame, rigidly attachable to said stopper,
   a hydraulic circuit including a double-acting hydraulic cylinder and a reversible hydraulic pump, said double-acting hydraulic cylinder having a first chamber and a second chamber between which a piston slides, said reversible hydraulic pump being connected to said first chamber and second chamber in such a way that a rotation of the reversible pump in one sense of rotation sends fluid directly to the first chamber, thus determining a movement of the piston in a first direction and a rotation of the reversible pump in the other sense of rotation sends fluid directly to the second chamber, thus determining a movement of the piston in a second direction opposite the first direction, said piston being attached to said control rod,
   a control circuit connected to said hydraulic circuit to control a position of said piston, characterized in that said reversible hydraulic pump is directly connected to said first chamber and second chamber of said double-acting hydraulic cylinder, respectively by means of a first branch and a second branch of said hydraulic circuit wherein said hydraulic circuit and pump are entirely housed in said containing frame.

2. A control device according to claim 1, wherein said reversible hydraulic pump is actuated by means of an electric motor connected to said control circuit.

3. A control device according to claim 2, wherein said reversible hydraulic pump and said electric motor are corrected to each other in a fixed manner.

4. A control device according to claim 2, wherein said reversible hydraulic pump and said electric motor are connected to each other by means of a quick connector.

5. A control device according to claim 1, wherein said control circuit is feedback-controlled.

6. A control device according to claim 5, wherein said control circuit comprises a position transducer to detect the position of the piston, said position transducer being housed in said frame.

7. A control device according to claim 6, wherein said control circuit comprises a control unit connected to said electric motor and to said position transducer.

8. A control device according to claim 5, wherein the control circuit comprises a level sensor to measure a level of liquid steel in an ingot mold, said level sensor being connected to said control unit.

9. A control device according to claim 6, wherein the control circuit comprises a level sensor to measure a level of liquid steel in an ingot mold said level sensor being connected to said control unit.

10. A control device according to claim 7, wherein the control circuit comprises a level sensor to measure a level of liquid steel in an ingot mold, said level sensor being connected to said control unit.

11. A control device according to claim 1, wherein said hydraulic circuit includes a bypass valve to put said first chamber and second chamber of said double-acting hydraulic cylinder into communication to each other.

12. An apparatus comprising:
a vessel for molten, steel including a drain hole for, an outflow of said molten steel,
a stopper working on said drain hole to adjust said outflow,
a control device for said stopper comprising:
a frame,
a control rod sliding through said frame, and rigidly attachable to said stopper,
a hydraulic circuit including a double-acting hydraulic cylinder and a reversible hydraulic pump, said double-acting hydraulic cylinder having a first chamber and a second chamber between which a piston slides, said reversible hydraulic, pump being connected to said first chamber and second chamber in such a way that a rotation of the reversible pump in one sense of rotation sends fluid directly to the first chamber, thus determining a movement of the piston in a first direction and a rotation of the reversible pump in the other sense of rotation sends fluid directly to the second chamber, thus determining a movement of the piston in a second direction opposite the first direction, said piston being attached to said control rod,
a control circuit connected, to said hydraulic circuit to control a position of said piston, characterized in that said reversible hydraulic pump is directly connected to said first chamber and second chamber of said doable-acting hydraulic cylinder, respectively by means of a first branch and a second branch of said hydraulic circuit wherein said hydraulic circuit and pump are entirely housed in said containing frame.

* * * * *